A. F. GLASER & J. OLSEN.
RESILIENT WHEEL.
APPLICATION FILED OCT. 25, 1907.
912,305.
Patented Feb. 16, 1909.
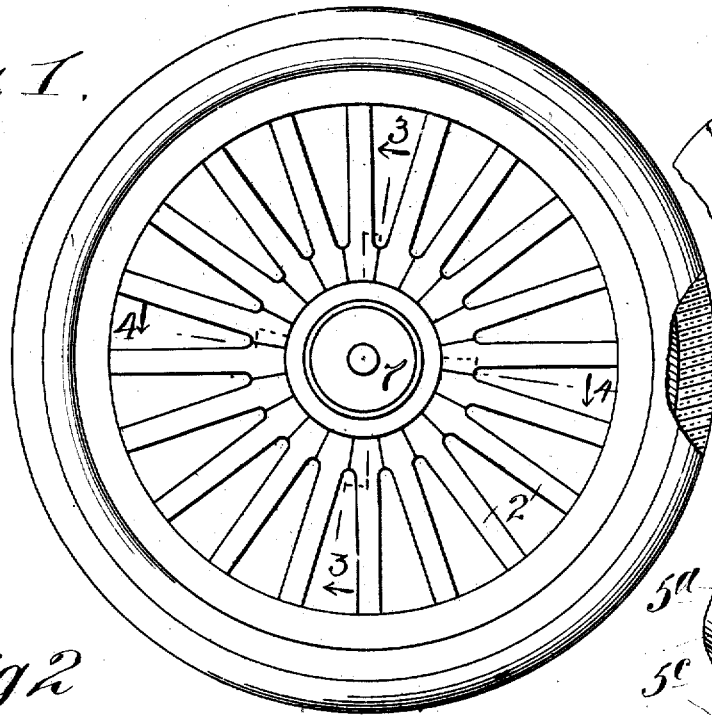
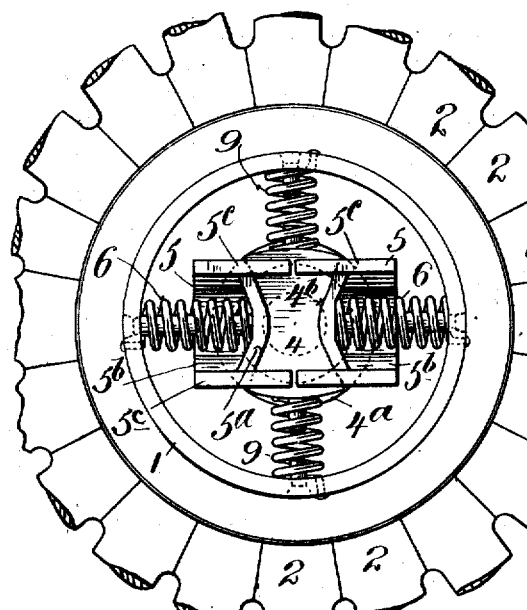
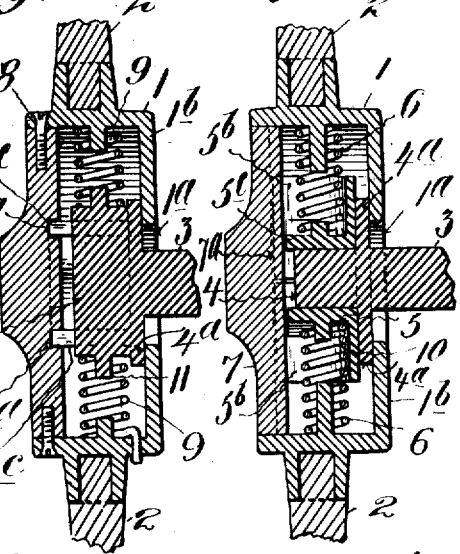
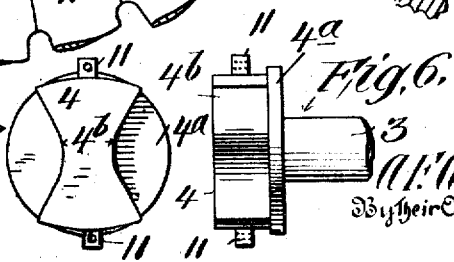
Witnesses:
C. N. Benjamin
Marie J. Wainright
Inventors
A. F. Glaser & John Olsen
By their Attorney
T. F. Bourne

UNITED STATES PATENT OFFICE.

ADAM F. GLASER, OF JERSEY CITY, AND JOHN OLSEN, OF WHIPPANY, NEW JERSEY, ASSIGNORS OF ONE-THIRD TO GEORGE W. CRANE, OF RAHWAY, NEW JERSEY.

RESILIENT WHEEL.

No. 912,305.     Specification of Letters Patent.     Patented Feb. 16, 1909.

Application filed October 25, 1907. Serial No. 399,088.

*To all whom it may concern:*

Be it known that we, ADAM F. GLASER, of Jersey City, Hudson county, New Jersey, and JOHN OLSEN, of Whippany, Morris county, New Jersey, have invented certain new and useful Improvements in Resilient Wheels, of which the following is a specification.

The object of our invention is to provide improved means for resiliently connecting the hub of a wheel with its axle, to reduce the jar and shock transmitted from the wheel when running on the road.

The invention comprises a hub, movable blocks on opposite sides of the axis of the hub, a head member interposed between said blocks and having cam-like faces, springs interposed between said blocks and hub, and means for slidably and rotatively connecting said blocks with the hub, all whereby the axle and hub will be resiliently connected and whereby the axle will rotate the hub, or vice versa.

The invention further comprises the novel details of improvement and combinations of parts that will be more fully hereinafter set forth and then pointed out in the claims.

Reference is to be had to the accompanying drawings forming part hereof, wherein, Figure 1 is a side view of a wheel embodying our invention, Fig. 2 is a detail view of the hub enlarged, the cover plate being removed, Fig. 3 is a vertical section, enlarged, on the line 3, 3, in Fig. 1, Fig. 4 is a horizontal view on the line 4, 4, in Fig. 1, Fig. 5 is a perspective of one of the spring blocks, Fig. 6 is an edge view of part of the axle and its head, Fig. 7 is a face view thereof, looking from the left in Fig. 6, and Fig. 8 is a detail of the axle head.

Similar numerals of reference indicate corresponding parts in the several views.

The numeral 1 indicates a hollow hub of any suitable construction and connected with the spokes 2 in any well known or suitable manner, and at 3 is an axle adapted to have free movement in all directions within an opening $1^a$ in the wall $1^b$ of the hub, said opening being of sufficient area to permit the axle to play therein to the desired extent. Axle 3, at the part within hub 1, is provided with a head or cam member 4 which may be formed on or secured to said axle, which head has an annular flange or disk-like portion $4^a$ adapted to fit and slide against the inner face of wall $1^b$ and to close the opening $1^a$. Head or member 4 on opposite sides is provided with concave or cam-like faces $4^b$, located on the side of disk $4^a$ opposite axle 3, which concave or cam faces engage corresponding convex or cam faces $5^a$ on sliding blocks 5 located on opposite sides of head 4. The blocks 5 are shown recessed at $5^b$ and receive coiled springs 6 that bear against said blocks and against the walls of hub 1, to press said blocks against head 4. Blocks 5 have guide ribs or projections $5^c$ which enter guide grooves or ways $7^a$ in a disk 7 that is secured at or within the open end of hub 1, as by screws 8, or in other suitable manner, whereby the blocks 5 are guided to slide radially with respect to the axis of hub 1, and yet when said blocks are rotated they will cause rotation of the hub and wheel by reason of the connection between guides $5^c$ and ways $7^a$. Springs 9 may also be interposed between opposite sides of head 4 and hub 1 to assist in sustaining the axle resiliently with respect to the hub. Springs 6 and 9 may also be secured at their outer ends to hub 1 and at their inner ends respectively to blocks 5 and head 4 by any suitable means. For this purpose the inner ends of springs 6 and 9 may be passed through holes in studs 10 and 11 on blocks 5 and head 4 respectively, in the manner shown in Fig. 8, and the outer ends of said spring may be passed through holes in the hub 1 and secured by riveting or bending the ends of the springs, as in Fig. 3. Although the springs may merely rest against the hub, the block, and the head 4, by having the springs secured to said parts the advantage is gained of utilizing the resistance to expansion of the springs as well as to their compression.

With a hub arranged as set forth, the head 4 and axle will normally be maintained substantially axially of the hub by the pressure of the springs and the bearing of the faces $5^a$ of the blocks against the corresponding faces $4^b$ of head 4, as the blocks are maintained in relative position radially in the guide-way 7 at all times, and when the wheel meets obstructions, or depressions in the road the shock will be absorbed and the axle relieved correspondingly from the shock by reason of the fact that the axle may move freely within the opening 1ᵃ of the hub 1 and the cam faces of head 4 may slide against the corresponding faces 5ᵃ of blocks 5, the springs 6 resisting the sliding movement of head 4 between the blocks, the tendency of said springs and blocks being to restore head 4 and the axle to the normal axial position within the hub, and as blocks 5 may slide in their guideways the head 4 is free to move under the resistance of the springs in any required direction; the springs 9 also resist movements of head 4 in different directions relative to said springs. If axle 3 be driven rotational strains from head 4 will be transmitted to blocks 5 and thence by the guides 5ᶜ and guideways 7ᵃ of disk 7 to the hub and wheel.

By means of our improvements pneumatic tires on wheels may be dispensed with, and any suitable tire 12 may be utilized, such as solid or cushion rubber, metal, or wood tires, and the resiliency of the axle within the hub obtains advantages of a pneumatic tire without the disadvantages and troubles thereof.

Our invention is not limited to the details of construction and arrangements of parts set forth as the same may be varied within the scope of the appended claims without departing from the spirit of the invention.

Having now described our invention what we claim is:

1. The combination of a hub provided with an opening to permit free movement of an axle therein, a head for the axle and provided with opposed cam faces, blocks provided with corresponding faces opposed to the faces of said head, springs interposed between the blocks and the hub, and means for slidably and rotatively connecting said blocks with said hub.

2. The combination of a hub provided with an opening to permit free movement of an axle therein, a head for the axle and provided with opposed cam faces, blocks provided with corresponding faces opposed to the faces of said head, springs interposed between the blocks and the hub, said hub being provided with a guideway, and said blocks being provided with guides received in said guideway for rotatively and slidably connecting the blocks with the hub.

3. The combination of a hub provided with an opening to permit movement of an axle therein, a head, blocks on opposite sides of said head, said head and blocks having respectively concavo-convex meeting faces, springs interposed between said blocks and the hub to press the blocks against the head, and means for rotatively and slidably connecting said blocks with said hub.

4. The combination of a hub provided with an opening to permit free movement of an axle therein, a head, blocks on opposite sides of said head, said blocks and head having co-acting cam-like faces, springs interposed between the blocks and the hub to push the blocks against the head, a disk secured to said hub, and guides connecting said blocks with said disk for rotatively and slidably uniting said blocks with said hub.

5. The combination of a hub provided with an opening to permit free movement of an axle therein, a head, blocks on opposite sides of said head, and cam-like faces between said blocks and head, springs interposed between said blocks and hub, guides carried by said blocks, and a disk secured to the hub and provided with guideways receiving said guides of said blocks.

6. The combination of a hub provided with an opening to permit free movement of an axle therein, a head for the axle provided with cam faces, blocks provided with complemental faces opposed to the faces of said head, springs interposed between the blocks and the hub, means for slidably and rotatively connecting said blocks with said hub, and springs interposed between said hub and said head.

7. The combination of a hub provided with an opening to permit free movement of an axle therein, a head for the axle provided with cam faces, blocks provided with complemental faces opposed to the faces of said head, springs interposed between the blocks and the hub, and means for slidably and rotatively connecting said blocks with said hub, said springs being secured to said blocks and said hub.

8. The combination of a hub provided with an opening to permit movement of an axle therein, a head for the axle provided with opposed cam faces, blocks provided with complemental faces opposed to the faces of said head, springs interposed between the blocks and the hub, and means for slidably and rotatively connecting said blocks with said hub, and springs interposed between said hub and said head, said springs being secured respectively to the hub and to the blocks and the head.

9. The combination of a head provided with an opening to permit free movement of an axle therein, with an axle, a head secured to said axle and provided with a flange opposed to said opening, blocks on opposite sides of said head, and cam faces between said head and said blocks, a disk secured to said hub, and means for slidably and rotatively connecting said blocks with said disk.

10. The combination of a head provided with an opening to permit free movement of an axle therein, with an axle, a head secured to said axle and provided with a flange opposed to said opening, blocks on opposite sides of said head, cam faces between said head and said blocks, a disk secured to said hub, means for slidably and rotatively connecting said blocks with said disk, and springs interposed between said head and said hub.

ADAM F. GLASER.
JOHN OLSEN.

Witnesses:
EDWIN HILBORN,
MARIE F. WAINRIGHT.